Patented Nov. 21, 1944

2,363,209

UNITED STATES PATENT OFFICE 2,363,209

ISOMERIZATION OF TERPHENYLS

Robert D. Swisher, Winchester, Mass., assignor to Monsanto Chemical Company, St. Louis, Mo., a corporation of Delaware No Drawing. Application August 31, 1942, Serial No. 456,793

16 Claims. (Cl. 260—668)

This invention relates to catalytic isomerization reactions, and particularly to the isomerization of terphenyls.

It is a primary object of the invention to prepare high yields of meta or para terphenyl from any of their isomers or from mixtures thereof.

A further object of the invention is to prepare equilibrium mixtures of meta and para terphenyl from which either or both of these isomers may be readily isolated.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention is predicated on the discovery that when any of the isomers of terphenyl, or mixtures thereof, are subjected to the action of an aluminum halide, such as aluminum chloride or aluminum bromide, and the reacting mass is brought to a liquid state, an equilibrium mixture of meta and para terphenyl is soon formed containing a preponderating amount, e. g., about 65 to 70%, of meta terphenyl. When meta terphenyl is desired as an end product, it is separated in any desired manner from this equilibrium mixture. When yields of para terphenyl higher than 35% are desired, the liquid containing the equilibrium mixture is cooled to a temperature at which crystals begin to form, and is held at or preferably below this temperature until the desired amount of terphenyl has crystallized out as para terphenyl. It is possible in this manner to obtain mixtures of terphenyl containing as much as 90% para terphenyl or even more.

Another and preferred method of obtaining large amounts of para terphenyl from any of its isomers, or mixtures thereof, involves subjecting the selected isomer or mixture of isomers to the action of an aluminum halide, while maintaining the reacting mass in a partially liquid and partially solid state. Thus, it is unnecessary to first form an entirely liquid mass of the reacting ingredients, and then cool to below the crystallizing point, as the same end result may be obtained by carrying out the reaction at the lower temperature or under conditions which cause the immediate separation of crystals of para terphenyl.

To bring the reacting mass to a completely liquid state, as when it is desired to form an equilibrium mixture, the mass is either heated, or it may be dissolved in a suitable inert solvent with or without the use of heat. When no solvent is employed, the temperature at which the equilibrium mixture becomes completely liquid is about 165° C. When solvent is employed, however, the temperature at which the equilibrium mixture becomes completely liquid is usually lower, but may be higher, the exact temperature depending upon the amount and kind of solvent used. It is even possible to obtain an equilibrium mixture at room temperature provided sufficient solvent is employed to maintain the mass in a liquid state. In this case however, the reaction is necessarily considerably slower than when heat or a combination of heat and solvent is used to bring about liquefaction.

A wide variety of solvents is suitable for the purposes of this invention. Thus, in general, any of the solvents commonly used in Friedel-Crafts or other anhydrous aluminum chloride reactions, such as for example, benzene, carbon disulfide, ether, chlorbenzene, nitrobenzene, and the like, may be used.

The mixtures of terphenyl isomers obtained according to any of the procedures described above may be separated into their constituents by a variety of methods. It is usually preferable to first quench the mixture and wash out the aluminum salts with water or dilute hydrochloric acid. The resulting mixture of terphenyls may then be purified by distillation, after which it is separated into its constituents by fractional crystallization from or extraction with a suitable solvent, such as ethyl alcohol, carbon tetrachloride, or the like. It is also possible to purify and separate the terphenyl mixtures into their constituents by fractional distillation or fractional crystallization alone.

A more complete understanding of the invention will be obtained from the following examples:

Example I

Fifteen hundredths of a gram of anhydrous aluminum chloride is added to 14.5 grams of para terphenyl (M. P. 210° C.) which has been previously melted, and the mixture is maintained at 210 to 220° C. for about one-half hour. The resulting melt or equilibrium mixture is quenched by pouring it onto 100 grams of ice, after which about 10 cubic centimeters of concentrated hydrochloric acid are added. The aqueous mixture is then boiled in order to insure complete solution of the aluminum chloride, and then cooled and filtered. The organic material remaining is dried, and then boiled in about 50 cubic centimeters of 95% alcohol. About 5 grams of para terphenyl remain undissolved and are removed by filtering hot. The alcohol filtrate is then concentrated and cooled, which results in about 8.4 grams of crystals of meta terphenyl having a melting point of 85° C. A test sample of this product does not depress the melting point of authentic meta terphenyl.

*Example II*

A melt or equilibrium mixture of meta and para terphenyl is prepared by reacting 10 grams of para terphenyl with 0.1 gram of anhydrous aluminum chloride at 220° C. for about one-half hour. The hot mixture is then quenched by pouring it onto ice, and then washed and dried, yielding 9.6 grams of a crude terphenyl mixture. Nine and a half grams of this product are then distilled at atmospheric pressure, yielding 8.5 grams of a colorless distillate (B. P. 365–375° C.) containing 64% of meta terphenyl and 36% of para terphenyl.

*Example III*

When 10 grams of meta terphenyl are treated with 0.1 gram of anhydrous aluminum chloride in the manner described in Example II, eight and three tenths grams of a colorless distillate (B. P. 365–375° C.) containing 65% of meta terphenyl and 35% of para terphenyl are obtained.

*Example IV*

When 10 grams of ortho terphenyl and 0.3 gram of anhydrous aluminum chloride are reacted and further treated in the manner described in Example II, eight grams of a colorless distillate (B. P. 364–378° C.) containing 67% of meta terphenyl and 33% of para terphenyl are obtained.

*Example V*

Ten grams of a mixture of terphenyl isomers consisting of 20% of meta terphenyl and 80% of para terphenyl are reacted with 0.3 gram of anhydrous aluminum chloride at 190° C. for about one-half hour. The hot mixture or melt is then quenched and further treated as described in Example II. Eight and one-tenth grams of a colorless distillate are obtained containing 64% meta terphenyl and 36% para terphenyl.

*Example VI*

Ten grams of para terphenyl and 3 grams of anhydrous aluminum chloride are refluxed in 50 cubic centimeters of benzene for about one hour. The resulting benzene solution is poured onto ice, and then boiled to remove the benzene. The remaining mixture of water and terphenyls is then washed and further treated in the manner described in Example II, which yields 9.15 grams of a colorless distillate (B. P. 372–384° C.) containing 65.5% of meta terphenyl and 34.5% of para terphenyl. Upon boiling the distillate with alcohol, the meta terphenyl is dissolved and separated from the insoluble para terphenyl by filtration. The filtrate is then evaporated to dryness, leaving the meta terphenyl.

*Example VII*

Ten grams of meta terphenyl are reacted with one gram of anhydrous aluminum chloride at 110° C. for about 1 hour. The resulting reaction mixture, which is in a partially liquid and partially solid state, is then quenched by mixing it with ice, and is then washed and dried, yielding 9.4 grams of a crude terphenyl mixture. Nine and three tenths grams of the resulting product are then distilled at atmospheric pressure, yielding 8.15 grams of a colorless distillate containing 80% of para terphenyl and 20% of meta terphenyl. Pure para terphenyl is then obtained from the distillate by boiling the mixture with alcohol and filtering off the alcoholic solution from the insoluble para terphenyl, which has a melting point of 210° C. A test sample of this product does not depress the melting point of authentic para terphenyl.

*Example VIII*

Ten grams of ortho terphenyl are reacted with three grams of anhydrous aluminum chloride at 110° C. for about 1 hour. The resulting reaction mixture, which is in a partially liquid and partially solid state, is then quenched by mixing it with ice, and then washed and dried, yielding 9.3 grams of a crude terphenyl mixture. Nine and two tenths grams of this product are then distilled at atmospheric pressure, yielding 7.35 grams of a colorless distillate containing 90% of para terphenyl and 10% of meta terphenyl. The resulting mixture is then treated in the manner described in Example VI to obtain pure para terphenyl.

*Example IX*

Ten grams of meta terphenyl, one gram of anhydrous aluminum chloride and 10 cubic centimeters of benzene are mixed and then refluxed for about 4 hours. The resulting reaction mixture, which is in a partially liquid and partially solid state, is quenched with ice, boiled to remove the benzene, and then washed and dried, yielding 9.75 grams of a crude terphenyl mixture. Nine and seven tenths grams of this product are then distilled at atmospheric pressure, yielding 8.85 grams of a colorless distillate (B. P. 368–380° C.) containing 75% of para terphenyl and 25% of meta terphenyl. The resulting mixture is then treated in the manner described in Example VI to obtain pure para terphenyl.

It should be understood that it is not necessary, when preparing the equilibrium mixture of terphenyl isomers described above and in the examples, to maintain the reacting mass in an entirely liquid state during the entire reaction. Thus, it is sufficient if the mass is in an entirely liquid state only at the end of the reaction. Likewise, when preparing the mixtures containing large amounts of para terphenyl it is unnecessary to maintain the reacting mass in a partially liquid and partially solid state during the entire reaction, as in general it is sufficient if the reacting mass is in a partially liquid and partially solid state during only the final stage of the reaction.

Where reference is made herein to "an entirely liquid state" and "a partially liquid and partially solid state," this is intended to refer only to the terphenyl constituents of the mass and not to other solids which may be present, such as undissolved aluminum halide.

Since slow side reactions take place simultaneously with the isomerization, which tend to destroy the catalytic activity of the aluminum halide, it is desirable to use certain minimum amounts of the catalyst to insure completion of the isomerization reactions. It is also desirable not to use too much of the catalyst, as the side reactions referred to also tend to destroy a certain amount of the terphenyls. In general, amounts of catalyst varying from 1 to 30% based on the weight of terphenyls are satisfactory.

When it is desired to make the equilibrium mixture containing 65-70% meta terphenyl in the absence of solvent, it is usually preferable to operate at temperatures between about 165° and 220° C. Higher temperatures than these may be used, but result in decreased yields of terphenyl isomers. When it is desired to make mixtures containing large amounts of para terphenyls in the absence of solvent, it is usually preferable to operate at temperatures between about 90° and 165° C. Temperatures approaching 165° C. however, tend to slow up the conversion to para terphenyl. Below 90° C. on the other hand the mass is apt to completely solidify before completion of the reaction. When solvent is employed in either of the above instances, the temperatures used will generally be lower.

In general the reactions, in order to reach completion, require from about 5 minutes to one hour, depending upon the amount of catalyst used, the temperature of reaction, and whether or not solvent is employed. However, in some instances, usually when large amounts of solvent are employed, as much as several hours may be required.

In describing the invention reference has been made solely to the treatment of substantially pure terphenyls or mixtures of terphenyls. The invention is also useful, however, in the treatment of crude isomers or mixtures of isomers, such as for example, the "high boiler" compounds obtained during the manufacture of diphenyl.

I claim:

1. The method of isomerizing terphenyls which comprises reacting a substance selected from the group consisting of terphenyls and mixtures of isomeric terphenyls with an anhydrous aluminum halide.

2. The method of making an equilibrium mixture of isomeric terphenyls which comprises reacting a substance selected from the group consisting of terphenyls and mixtures of isomeric terphenyls with an anhydrous aluminum halide, and bringing the reacting mass to an entirely liquid state.

3. The method of making meta terphenyl from its isomers which comprises reacting a substance selected from the group consisting of terphenyls and mixtures of isomeric terphenyls with an anhydrous aluminum halide, bringing the reacting mass to an entirely liquid state, so that an equilibrium mixture of isomeric terphenyls is formed, and then separating the meta terphenyl therefrom.

4. The method of making meta terphenyl from its isomers which comprises reacting a substance selected from the group consisting of terphenyls and mixtures of isomeric terphenyls with an anhydrous aluminum halide, heating the reacting mass to a point above its crystallizing temperature, so that an equilibrium mixture of isomeric terphenyls is formed, and then separating the meta terphenyl therefrom.

5. The method of making meta terphenyl from its isomers which comprises reacting a substance selected from the group consisting of terphenyls and mixtures of isomeric terphenyls with anhydrous aluminum chloride, heating the reacting mass to a temperature above 165° C. at least at the end of the reaction, whereby an equilibrium mixture of isomeric terphenyls is formed, and then separating the meta terphenyl therefrom.

6. The method of making meta terphenyl from its isomers which comprises mixing a substance selected from the group consisting of terphenyls and mixtures of isomeric terphenyls with an anhydrous aluminum halide and a solvent of the type commonly used in Friedel-Crafts reactions in amounts sufficient to form a liquid mass, so that an equilibrium mixture of isomeric terphenyls is formed, and then separating the meta terphenyl therefrom.

7. The method of making meta terphenyl from its isomers which comprises mixing a substance selected from the group consisting of terphenyls and mixtures of isomeric terphenyls, with anhydrous aluminum chloride, and a solvent of the type commonly used in Friedel-Crafts reactions, heating the reacting mass to a point above its crystallizing temperature, so that an equilibrium mixture of isomeric terphenyls is obtained, and then separating the meta terphenyl therefrom.

8. The method of making meta terphenyl from its isomers which comprises reacting a substance selected from the group consisting of terphenyls and mixtures of isomeric terphenyls with an anhydrous aluminum halide, bringing the reacting mass to a substantially liquid state at least at the end of the reaction, whereby an equilibrium mixture of isomeric terphenyls is obtained, and then quenching and purifying the reaction mass and separating the meta terphenyl therefrom.

9. The method of isomerizing terphenyls which comprises reacting a substance selected from the group consisting of terphenyls and mixtures of isomeric terphenyls with an anhydrous aluminum halide and maintaining the reacting mass in at least a partially liquid state, said mass at the end of the reaction being at a temperature below its crystallizing temperature.

10. The method of making para terphenyl from its isomers which comprises reacting a substance selected from the group consisting of terphenyls and mixtures of isomeric terphenyls with an anhydrous aluminum halide, maintaining the reacting mass in at least a partially liquid state, said mass at the end of the reaction being at a temperature below its crystallizing temperature, and then separating the para terphenyl therefrom.

11. The method of making para terphenyl from its isomers which comprises reacting a substance selected from the group consisting of terphenyls and mixtures of isomeric terphenyls with anhydrous aluminum chloride, bringing the reacting mass to a substantially liquid state so that an equilibrium mixture is formed, cooling the equilibrium mixture to a temperature below its crystallization point and then separating the para terphenyl therefrom.

12. The method of making para terphenyl from its isomers which comprises reacting a substance selected from the group consisting of terphenyls and mixtures of isomeric terphenyls with anhydrous aluminum chloride, heating the reacting mass to at least partially liquefy it and maintaining the mass at least at the end of the reaction at a temperature below its crystallization point, and then separating the para terphenyl therefrom.

13. The method of making para terphenyl from its isomers which comprises reacting a substance selected from the group consisting of terphenyls and mixtures of isomeric terphenyls with anhydrous aluminum chloride, heating the reacting mass to at least partially liquefy the mass and maintaining the mass at the end of the reaction at a temperature below 165° C., and then separating the para terphenyl therefrom.

14. The method of making para terphenyl from its isomers which comprises mixing a substance selected from the group consisting of terphenyls and mixtures of isomeric terphenyls, with anhydrous aluminum chloride and a solvent of the type commonly used in Friedel-Crafts reactions in amounts sufficient to form at least a partially liquid mass, said mass at the end of the reaction being at a temperature below its crystallization point, and then separating the para terphenyl therefrom.

15. The method of making para terphenyl from its isomers which comprises mixing a substance selected from the group consisting of terphenyls and mixtures of isomeric terphenyls, anhydrous aluminum chloride, and a solvent of the type commonly used in Friedel-Crafts reactions, heating the reacting mass to at least partially liquefy the mass, maintaining the mass at the end of the reaction at a temperature below its crystallization point, and then separating the para terphenyl therefrom.

16. The method of making para terphenyl from its isomers which comprises reacting a substance selected from the group consisting of terphenyls and mixtures of isomeric terphenyls with an anhydrous aluminum halide, maintaining the reacting mass in at least a partially liquid state, said mass at the end of the reaction being at a temperature below its crystallizing temperature, washing and purifying the mass, and then separating the para terphenyl therefrom.

ROBERT D. SWISHER.